D. H. WILSON.
BATTERY.
APPLICATION FILED MAY 2, 1919.

1,398,213.

Patented Nov. 22, 1921.

Inventor:
David H. Wilson
By Parker & Carter
Atty's.

UNITED STATES PATENT OFFICE.

DAVID H. WILSON, OF PHILADELPHIA, PENNSYLVANIA.

BATTERY.

1,398,213.  Specification of Letters Patent.  Patented Nov. 22, 1921.

Application filed May 2, 1919. Serial No. 294,255.

*To all whom it may concern:*

Be it known that I, DAVID H. WILSON, a citizen of the United States, residing at Philadelphia, in the county of Philadelphia and State of Pennsylvania, have invented a certain new and useful Improvement in Batteries, of which the following is a specification.

This invention relates to improvements in electric battery apparatus, and has for its object to provide a new and improved primary battery wherein there is a large active area of the electrodes, and a very efficient and economical battery produced.

Referring now to the accompanying drawings—

Like numerals refer to like parts throughout the several figures.

Figure 1:
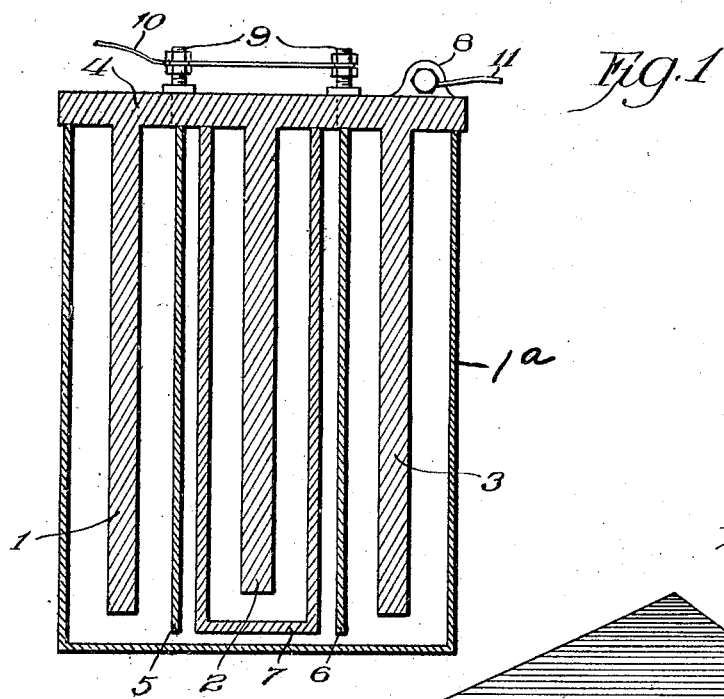
Figure 1 is a view showing a battery embodying the invention.
Figure 2:
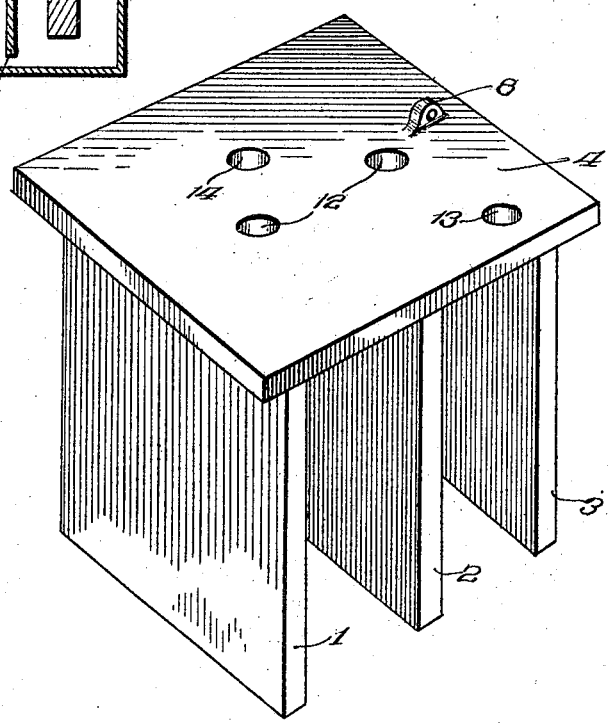
Fig. 2 is a view of one of the electrodes.

In carrying out my invention I provide a jar or container $1^a$ containing the electrodes. One of these electrodes is a carbon electrode and consists of the three members or plates 1, 2 and 3 separated from each other and integral with the carbon connecting piece 4. This carbon connecting piece 4 also forms a cover for the jar. Intermediate the members of the carbon electrode are the zinc electrodes 5 and 6. A porous cup 7 surrounds the central carbon member 2, and is located between the zinc electrodes and the said carbon member.

Some suitable means is provided for connecting one branch 11 of the circuit with the carbon electrode, such for example as the connection 8. The zinc electrodes are provided with the connections 9 to which are connected the other branch 10 of the circuit. The two zinc connections 9 are connected together. The carbon connecting piece 4 is provided with openings 12 for the zinc connections or binding posts and with openings 13 and 14 for the insertion of the depolarizer and active solutions. This construction allows me to make a four square battery and by the arrangement of the electrodes I am able to get the same action on the entire surface of the zinc, both the inner and outer surface, the action on the outer surface of the zinc being fully as effective as the action on the inner surface.

Figure 3:
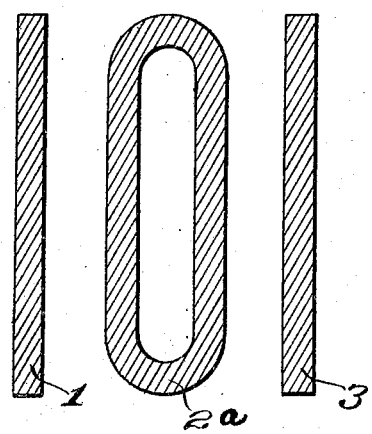
Fig. 3 is a view showing a modified construction of the carbon electrode.

In Fig. 3 I have shown a modified construction wherein the central section $2^a$ of the carbon electrode is made hollow so that it may be filled with manganese for open circuit work, thereby saving the extra porous cup and considerable labor.

I have shown in detail a particular construction embodying my invention, but it is of course evident that the parts may be varied without departing from the spirit of the invention as embodied in the claims hereto appended, and I therefore do not limit myself to the particular construction shown.

I claim:—

1. An electric battery comprising a receptacle containing the battery solution, a carbon electrode separate from said receptacle and adapted to be inserted therein and comprising three separated carbon plates located in said receptacle, a carbon connecting piece integral with said plates and zinc electrodes in the spaces between the separated carbon plates, whereby there is a simultaneous action on both the inner and outer surfaces of the zinc electrodes and a porous cup surrounding the central carbon plate.

2. An electric battery comprising a receptacle containing the battery solution, a carbon electrode separate from said receptacle and adapted to be inserted therein and comprising three separated carbon plates located in said receptacle, a carbon connecting piece integral with said plates and zinc electrodes in the spaces between the separated carbon plates, whereby there is a simultaneous action on both the inner and outer surfaces of the zinc electrodes, said carbon connecting piece acting as the cover for the receptacle.

3. An electric battery comprising a receptacle containing the battery solution, a carbon electrode separate from said receptacle and adapted to be inserted therein and comprising three separated carbon plates located in said receptacle, a carbon connecting piece integral with said plates and zinc electrodes in the spaces between the separated carbon plates, whereby there is a simultaneous action on both the inner and outer surfaces of the zinc electrodes, said carbon connecting piece acting as the cover for the receptacle, said carbon connecting piece rectangular in shape and one or more openings therein through which the binding posts for the zinc electrodes pass.

4. An electric battery comprising a receptacle, a carbon electrode separate from said receptacle and adapted to be inserted therein and comprising a plurality of separated carbon plates, a carbon connecting piece, the carbon connecting piece being integral with said plates, the central carbon plate being hollow and adapted to receive material therein.

5. A combined cover and electrode for an electric battery comprising three carbon plates, separated from each other, a carbon connecting piece with which said plates are integrally connected, the connecting piece forming the cover for the jar into which the electrode is inserted.

In testimony whereof, I affix my signature in the presence of two witnesses this 29th day of April, 1919.

DAVID H. WILSON.

Witnesses:
 CORA M. WILSON,
 R. B. RANNEY.